United States Patent
Gardenhour, Jr. et al.

[11] Patent Number: 5,575,506
[45] Date of Patent: Nov. 19, 1996

[54] ERASABLE WRITING PAD

[76] Inventors: Charles E. Gardenhour, Jr., 3126 Belle View Ave., Cheverly, Md. 20785; Christopher E. Gardenhour, 6125 43rd St., Riverdale, Md. 20737

[21] Appl. No.: 426,616

[22] Filed: Apr. 21, 1995

[51] Int. Cl.⁶ .................................................. G01B 3/02
[52] U.S. Cl. ................... 281/39; 33/760; 33/768
[58] Field of Search .................. 33/760, 768; 281/39; 434/408

[56] References Cited

U.S. PATENT DOCUMENTS

| | | | |
|---|---|---|---|
| 1,867,218 | 7/1932 | Hanson | 402/502 X |
| 3,269,392 | 8/1966 | McLain | 402/502 X |
| 4,766,673 | 8/1988 | Bolson | 33/760 |
| 4,786,010 | 11/1988 | Dynan | 33/760 X |
| 4,863,113 | 9/1989 | Dynan | 434/408 |
| 5,011,188 | 4/1991 | Zoland et al. | 281/45 X |
| 5,079,581 | 1/1992 | Sill | 33/760 |
| 5,190,317 | 3/1993 | Zoland | 281/45 X |
| 5,430,952 | 7/1995 | Betts | 33/760 |
| 5,459,942 | 10/1995 | Hintz, Jr. | 33/760 X |

FOREIGN PATENT DOCUMENTS 10418 of 1885 United Kingdom ..................... 33/760

*Primary Examiner*—Frances Han
*Attorney, Agent, or Firm*—Aquilino & Welsh

[57] ABSTRACT

A writing pad for attachment to the clip of a standard tape measure. The writing pad is made from a substantially rigid material, having at least one writing surface, the writing surface being sufficiently hard and abrasive to permit the writing surface to be marked by a standard writing instrument. The writing pad further includes an opening adjacent an edge of the writing pad, creating a lip dimensioned to releasably engage the clip of a standard tape measure. In use, the opening is passed around the clip to releasably secure the writing pad to the tape measure.

13 Claims, 3 Drawing Sheets

ERASABLE WRITING PAD

BACKGROUND OF THE INVENTION

1. Field of the Invention

The invention relates to erasable writing pads. More particularly, the invention relates to an erasable writing pad releasably secured to the clip of a standard tape measure.

2. Background of the Invention

Tape measures are one of the most commonly used tools by both skilled craftsmen and private homeowners. Whether an individual is a skilled carpenter or a homeowner doing a weekend project, individuals are often confronted with the necessity of making measurements based upon written instructions or taking measurements for later use and/or making sketches or material list. In all of these instances, individuals are often hampered by the unavailability of a convenient writing surface that is readily available, easy to use and inexpensive.

Past attempts to provide a marketable recording device for use in combination with a conventional tape measure have proven unsuccessful. For example, a series of superimposed plastic sheets, upon which inscriptions are impressed, have been used. The exposed plastic sheets and the associated moveable components of these devices have failed to survive rigorous use in the field. In addition, once the plastic sheet is rendered unusable, it is necessary to purchase a new tape measure having a new plastic sheet although the existing tape measure may still be functional. Alternatively, people have used measuring devices with a single plastic writing disk attached to the housing of a tape measure. However, the continued use of the plastic sheet causes pressure indentations on the surface, thereby making it unsuitable for further writing and these disk are limited in size. Furthermore, notations made on the plastic sheet frequently became smudged and unreadable while making additional measurements.

While U.S. Pat. Nos. 5,079,851 to Sill, 4,786,010 to Dynan and 4,766,673 to Bolson, attempt to overcome the deficiencies of these prior devices by providing writing surfaces for use in combination with tape measures, a fully convenient, durable and inexpensive writing surface, which is removable from the tape measure, is still needed by those individuals who find themselves looking for a convenient surface to record measurements, drawing sketches or making lists.

An alternative to the provision of writing surfaces in combination with tape measures is the use of a separate sheet of paper for recording measurements and other related information. The use of a separate sheet of paper is problematic in that it is not practical for a tool user to carry a sheet of paper around the work site. Individuals often overcome this problem by recording related data on construction materials. This method has met with limited success, as it is often very difficult, if not impossible, to remove the annotated materials when the dimensions are needed at a different location. Additionally, neither a piece of paper carried around the work sight or a piece of construction material are reusable.

The present invention overcomes the shortcomings of the prior art devices by providing a convenient, inexpensive, and reusable erasable writing pad for recording an individual's work related information, such as measurements, lists and sketches.

SUMMARY OF THE INVENTION

It is, therefore, an object of the present invention to provide a durable, reusable writing pad that can be used in conjunction with a tape measure to permit an individual to readily and conveniently record necessary work information and then remove the writing pad so that the writing pad can be used without the tape measure.

Another object of the present invention is the provision of an erasable writing pad adapted to be secured to the clip of a standard tape measure.

A further object of the present invention is the provision of an erasable writing pad releasably secured to the clip of a standard tape measure.

These and other objects are achieved by the present invention, which provides a writing pad for attachment to the clip of a standard tape measure. The writing pad is made from a substantially rigid material, having at least one writing surface, the writing surface being sufficiently hard and abrasive to permit the writing surface to be marked by a standard writing instrument. The writing pad further includes an opening adjacent an edge of the writing pad, creating a lip dimensioned to releasably engage the clip of a standard tape measure. In use, the opening is passed around the clip to releasably secure the writing pad to the tape measure.

Other objects, advantages and salient features of the invention will become apparent from the following detailed description, which taken in conjunction with the annexed drawings, discloses a preferred, but non-limiting, embodiment of the subject invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
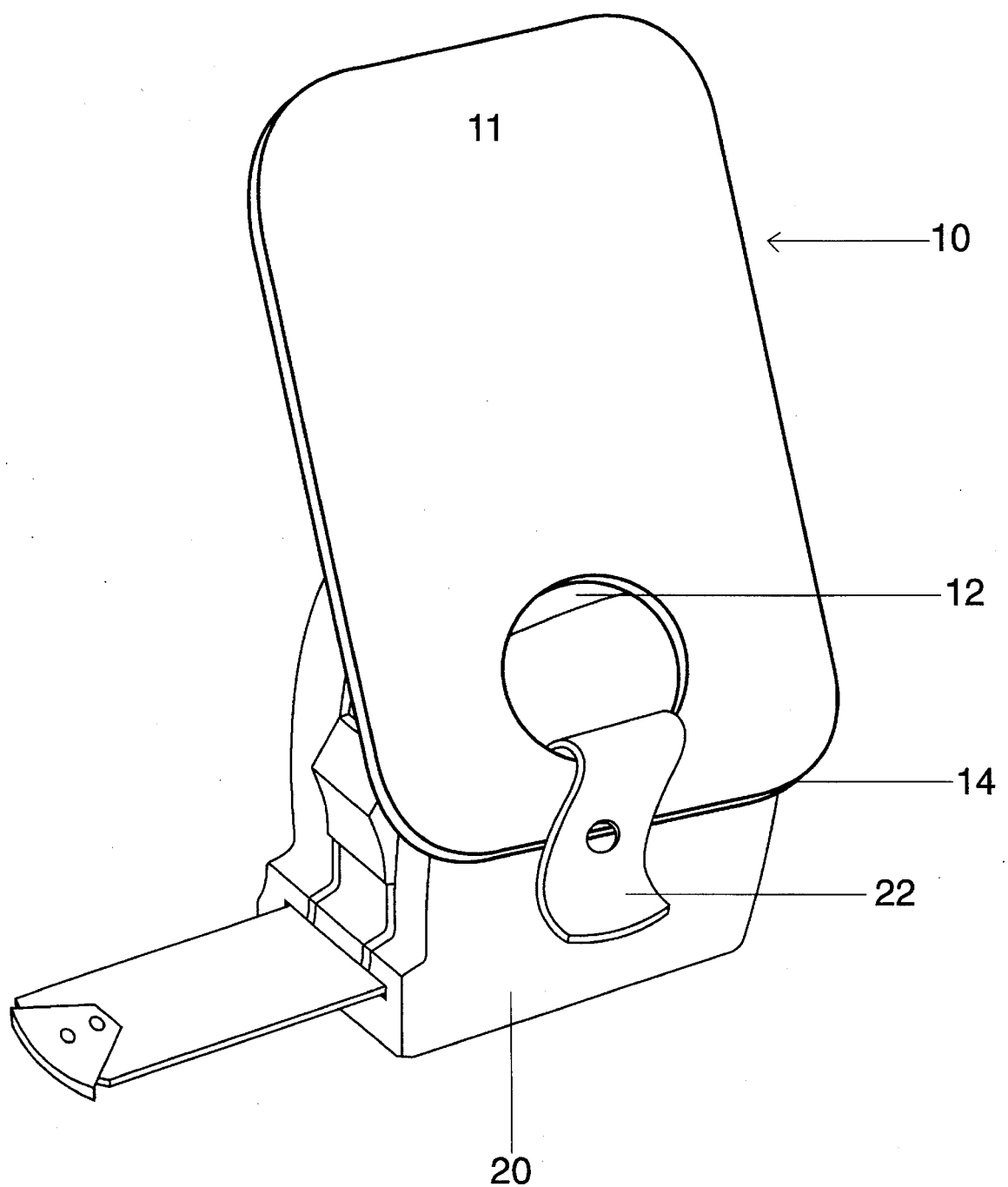
FIG. 1 is a perspective view of the present invention in its operative position.

Referring to FIG. 1, a rectangular writing pad 10 with rounded corners is shown in its operative position attached to the clip 22 of a conventional tape measure 20. The writing pad 10 is manufactured from a substantially rigid, thin plastic material and includes an upper surface 11 and an opposed lower surface 13. While the writing pad 10 of the preferred embodiment is made from a thin plastic material, it may be made from other materials without departing from the spirit of the present invention as long as the upper surfaces may be written on and then readily erased.

Additionally, while the disclosed writing pad is generally rectangular, the writing pad may take a variety of shapes without departing from the spirit of the present invention. In accordance with the preferred embodiment of the present invention, the writing pad 10 is sufficiently sized, shaped, and weighted to permit an individual to throw the pad 10 a distance without the writing pad 10 being substantially affected by wind resistance. Specifically, the writing pad 10 may be used by a worker to transfer information to another worker at the work site; for example, a worker on the second floor of a house could throw the writing pad 10 down to a worker on the ground floor when materials must be cut to specific measured dimensions. With this in mind, the disclosed embodiment of the writing pad 10 is designed to be approximately 5 inches long or less, 3 inches wide or less, and 1/32 inches thick.

At least the upper surface 11 of the writing pad is sufficiently hard and abrasive to permit the surface to be marked by a standard writing instrument. For example, the surface is manufactured to permit an individual to write on it with pencil, pen, or marker. The upper surface 11 is further manufactured to permit the removal of any markings made by the standard writing instrument by simply passing a finger or damp cloth across the marked portion of the writing pad.

Figure 2:
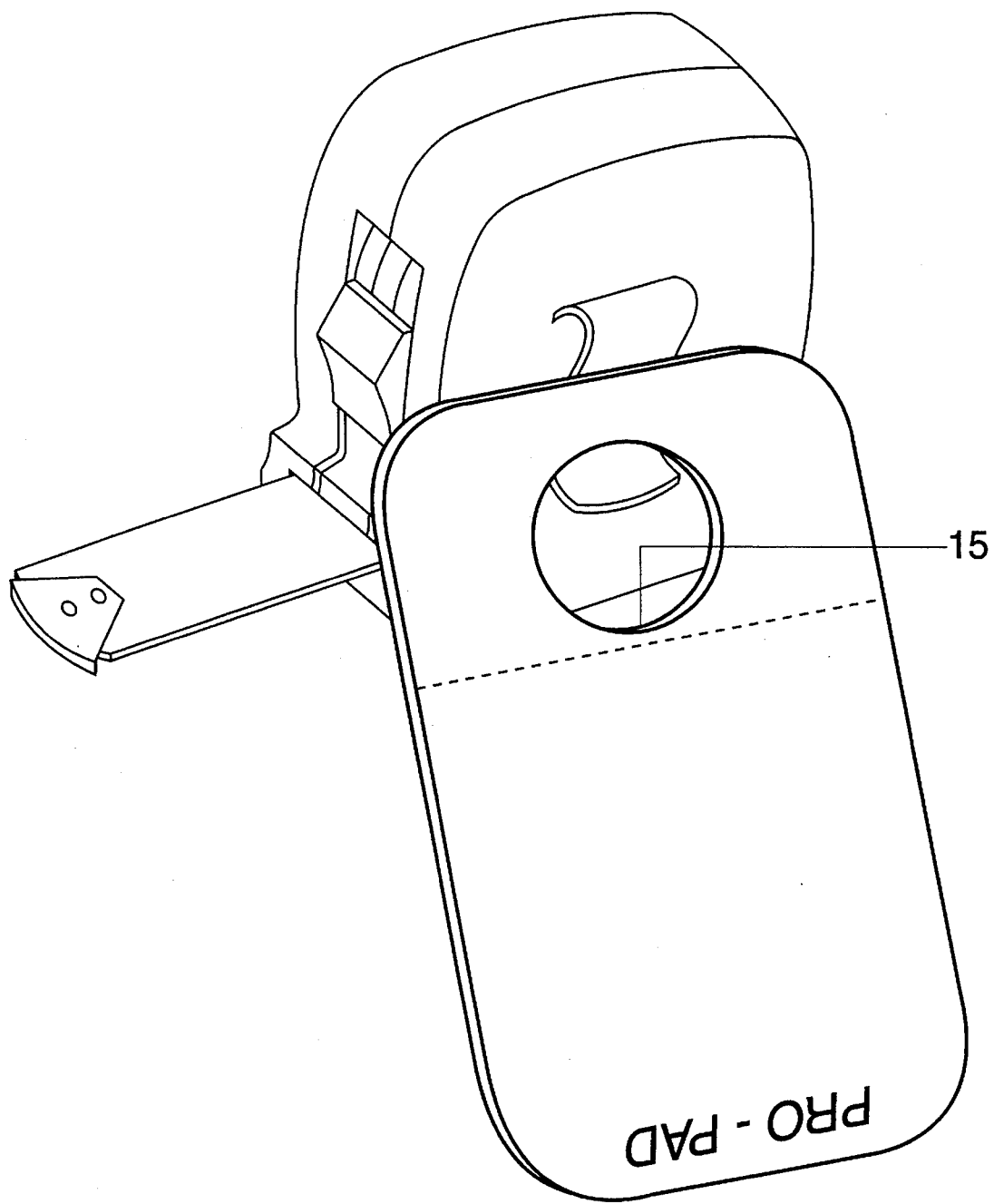
FIG. 2 is perspective view of the present invention being secured to the clip of a tape measure.

The writing pad is provided with a circular opening 12 adjacent a first edge 14 of the writing pad. The opening 12 is sized to permit the writing pad to be releasably secured to the clip 22 of the tape measure 20. Specifically, the writing pad is secured to the clip 22 of a tape measure 20 by first positioning the first edge 14 of the writing pad over the clip as shown in FIG. 2. The edge 15 of the opening opposite the first edge 14 is then forced under the clip 22 until the first edge 14 of the writing pad 10 passes above the clip 22 and the clip falls within the opening 12 as shown in FIG. 2.

As stated above, the opening 12 is dimensioned to be releasably secured by the clip. This is accomplished by providing an opening having a diameter which is only slightly larger than the width (w) of the clip. In this way, the opening surrounds the clip when the writing pad is properly positioned to securely attach the writing pad to the tape measure.

Figure 3:
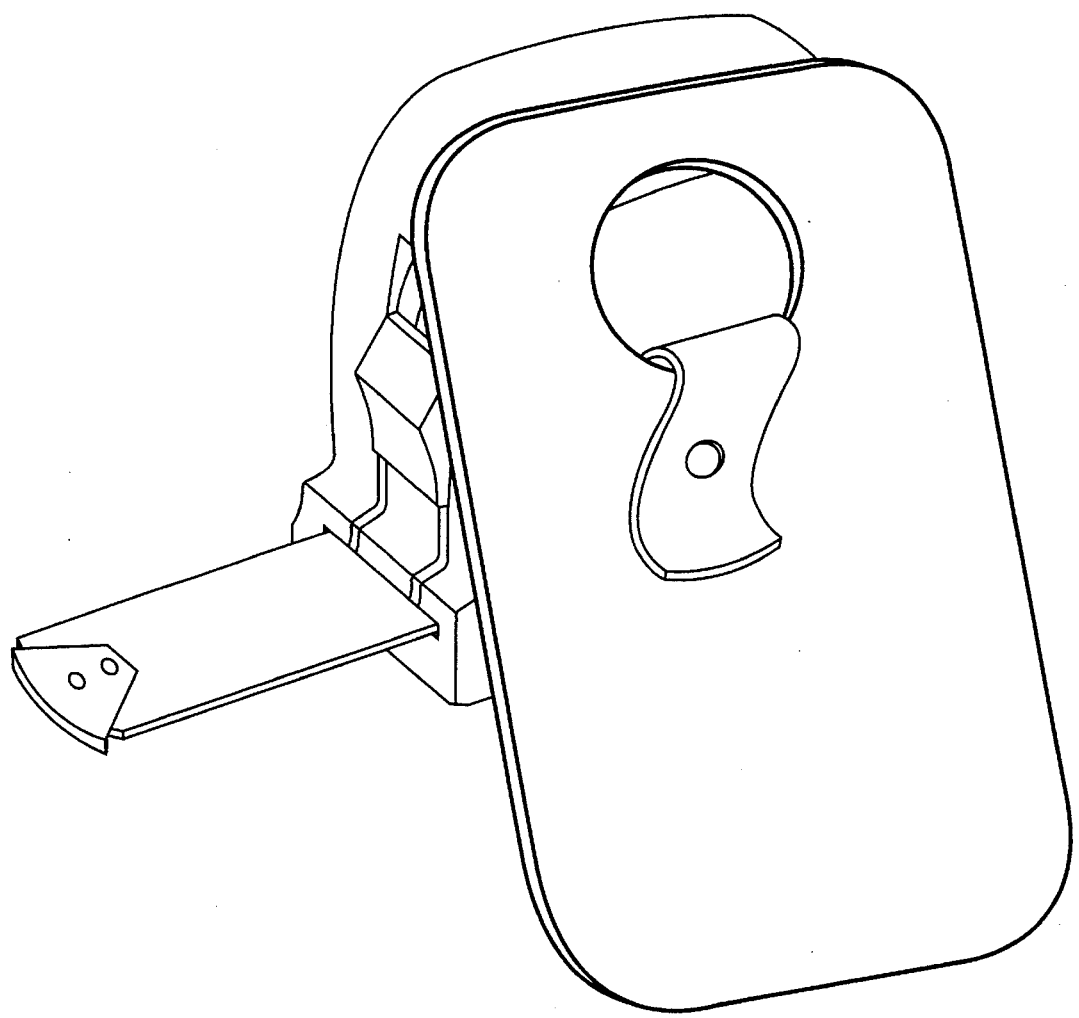
FIG. 3 is a perspective view of the present invention in a second position.

FIG. 1 shows the writing pad in its operative position. That is, the writing pad is oriented to permit an individual to conveniently write down any information that might be needed. However, the writing pad may be rotated 180 degrees to a storage position as shown in FIG. 3. When the writing pad is in its storage position it is not as easy to write on the writing pad, however, the writing pad is compactly stored adjacent the tape measure so that it does not extented inconveniently from the tape measure. The storage position of the writing pad also permits an individual to support the tape measure from his or her shirt pocket by placing the writing pad in the pocket while the tape measure is securely attached thereto. When used in this way, the writing pad provides additional support for the tape measure while it is held by the individuals pocket.

The writing pad may include preprinted indicia thereon and a scored or dotted cut line for separation from the end containing the hole (see FIG. 2). These features allow the device to be used as an advertising tool. Particularly, local and national hardware stores, as well as various other merchants, could use the writing pad as a promotional give away due to the minimum cost per unit.

The scored line allows the device to be used as a writing pad alone if one does not desire to connect the device to a tape measure. Additionally, the writing pad should be no wider than the tape measure to enhance the convenience associated with using the present invention.

While various preferred embodiments have been shown and described, it will be understood that there is no intent to limit the invention by such disclosure, but rather, is intended to cover all modifications and altcmate constructions falling within the spirit and scope of the invention as defined in the appended claims.

We claim:

1. A writing pad surface for attachment to the clip of a standard tape measure, comprising:

a writing pad made from a substantially rigid material having at least one writing surface, the writing surface being sufficiently hard and abrasive to permit the writing surface to be marked by a standard writing instrument; and, the writing pad including a means for releasably securing the writing pad to the clip of a standard tape measure such that the writing pad can rotate about the clip from a first use position to a second storage position, wherein the means includes an opening in the form of a hole adjacent an edge of the writing pad, the diameter of which is only slightly larger than the width of the clip.

2. The invention of claim 1, wherein the writing surface is made from a material which is readily erasable via the wiping of the surface with a finger.

3. The invention of claim 1, wherein the writing surface includes preprinted indica thereon.

4. The invention of claim 1, wherein the writing surface includes a scored line adjacent the opening.

5. The invention of claim 1, wherein the writing pad is made from a plastic material which is thin enough so as to be flexible.

6. The invention of claim 1, wherein the writing pad is dimension such that its width is less than the width of the tape measure it is used in conjunction with.

7. A tape measure writing pad combination comprising;

a measuring tape encased and coiled within a housing for extension and retraction from the housing, the measuring tape housing including a clip secured thereto; and, a writing pad releasably secured to the clip, the writing pad being made from a substantially rigid material having at least one writing surface that is sufficiently hard and abrasive to permit the writing surface to be marked by a standard writing instrument, the writing pad further including an opening adjacent an edge of the writing pad creating a lip dimensioned to releasably engage the clip, wherein the opening passes around the clip to releasably secure the writing pad to the tape measure.

8. The invention of claim 7, wherein the opening is of a diameter which is only slightly larger than the width of the clip, thereby allowing the writing pad to rotate.

9. The invention of claim 7, wherein the writing surface is made from a material which is readily erasable via the wiping of the surface with a finger.

10. The invention of claim 7, wherein the writing surface includes preprinted indica thereon.

11. The invention of claim 7, wherein the writing surface includes a scored line adjacent the opening.

12. The invention of claim 7, wherein the writing pad is made from a plastic material which is thin enough so as to be flexible.

13. The invention of claim 7, wherein the writing pad is dimension such that its width is less than the width of the tape measure it is used in conjunction with.

* * * * *